UNITED STATES PATENT OFFICE.

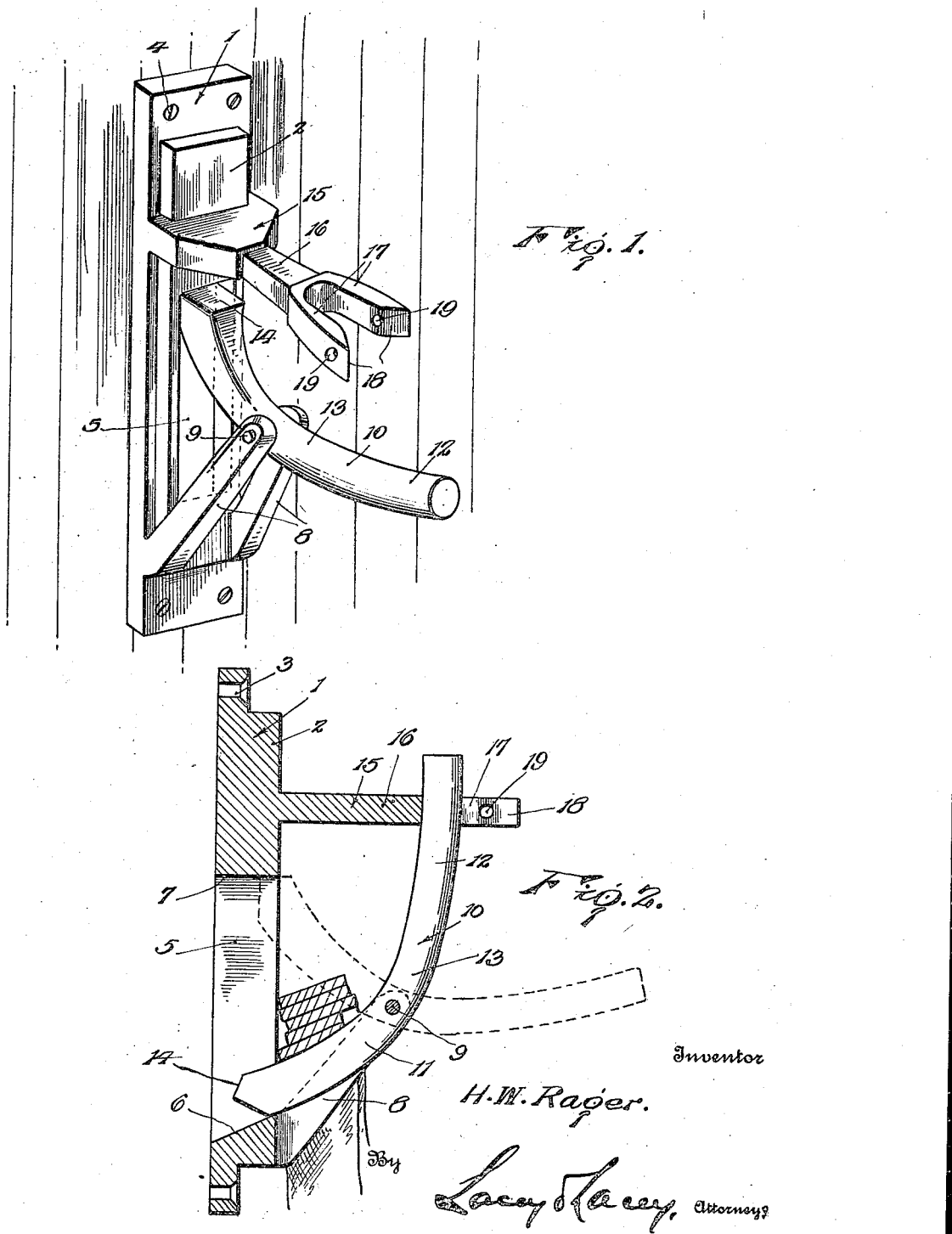

HARVEY W. RAGER, OF PONCA, NEBRASKA.

HARNESS HOOK.

1,422,128.  Specification of Letters Patent.  Patented July 11, 1922.

Application filed April 19, 1921. Serial No. 462,617.

*To all whom it may concern:*

Be it known that I, HARVEY W. RAGER, a citizen of the United States, residing at Ponca, in the county of Dixon and State of Nebraska, have invented certain new and useful Improvements in Harness Hooks, of which the following is a specification.

This invention relates to improvements in harness hooks and has as one of its objects to provide a hook of this class so constructed that when the harness is hung thereon it cannot become accidentally dislodged by the horses or other animals brushing thereagainst, the construction of the hook being such that it is necessary for the harness to be lifted bodily before it can be disengaged from the hook.

Another object of the invention is to provide a harness hook, so constructed that the bill of the hook will normally occupy such position as to enable the harness to be most conveniently placed upon the hook, and, if desired, suitably arranged or hung in the requisite loops, before final engagement with the hook in position to be supported so that the device serves in the first instance as a support upon which the harness may be hung and suitably arranged and in the second instance as a means for supporting the harness securely in place after it has been suitably arranged.

Another object of the invention is to provide a hook of the class described so constructed that after the harness has been placed thereon the hook proper may be locked in its closed position so as to prevent theft of the harness or at least place an obstacle in the way of theft.

Another object of the invention is to so construct and mount the hook proper that its bill or end will project upwardly beyond the keeper therefor in such a manner that a harness collar may be disposed upon the said keeper and hung therefrom and will be retained in engagement therewith by the projecting end of the hook proper.

In the accompanying drawings:

Figure 1 is a perspective view of the harness hook embodying the present invention;

Figure 2 is a vertical front to rear sectional view therethrough, the hook being shown in dotted lines in the position which it will normally occupy and in full lines the position it occupies when harness is hung thereon, a piece of harness being illustrated hung over the hook.

The device embodying the invention comprises an attaching plate which is indicated in general by the numeral 1 and which is preferably provided upon its forward face with a raised portion or longitudinally extending boss indicated by the numeral 2. The plate 1 is flat upon its rear face and is designed to be disposed against any convenient part of the building within which the device is to be arranged, and the plate is provided preferably at its upper and lower ends with openings 3 through which may be passed screws or other suitable fastening elements indicated by the numeral 4, the device being in this manner secured in place.

For a purpose to be presently explained the attaching plate 1 and its boss 2 are formed with a vertically extending slot 5 the lower end wall of which is indicated by the numeral 6 and the upper end wall by the numeral 7. The plate is furthermore formed with a pair of spaced upwardly and forwardly inclined arms 8 between the upper ends of which a pivot pin 9 extends. The pivot pin 9 passes through the hook proper of the device which is indicated in general by the numeral 10 and the said hook is in this manner supported for pivotal movement between the arms 8. The hook 10 comprises a shank 11 and a bill 12 which parts are connected by an intermediate bend 13 so that the shank and bill extend at an obtuse angle to each other, the bill being somewhat longer than the shank but otherwise of approximately the same cross sectional dimensions so that the hook is normally overbalanced by gravity and will therefore assume the full line position shown in Figure 1 or the dotted line position shown in Figure 2. Thus in the normal position of the hook 10, its bill 12 extends forwardly at a slight upward angle of inclination from the pivot 9, and its shank 11 extends upwardly and rearwardly and engages at its extremity against the upper end wall 7 of the slot 5, the movement of the hook by gravity to its normal position being, by reason of such engagement, limited. Preferably the extremity of the shank 11 is beveled, as indicated by the numeral 14 so as to seat squarely against the upper end wall 7 of the slot 5 so that the hook will be firmly braced in the position stated. It will be observed by reference to the drawings that the rear end portion of the shank 11 of the hook 10 works in the slot 5 so that the hook is braced against lateral displacement and its pivot 9 is to a great extent relieved of strain, the slot 5 being of a width but slightly greater than the thickness of the shank 11 at its rear end and thus more or less snugly accommodating the said end of the shank.

The device further includes a keeper which is indicated in general by the numeral 15 and which comprises a shank 16 which extends forwardly from the plate 1 above the upper end 7 of the slot 5 and terminates in forwardly projecting spaced fingers 17 the opposing sides of which at their outer ends are rounded or beveled, as at 18, so as to permit of the more ready entrance of the end of the bill of the hook 12 between the fingers, the fingers being spaced apart a distance sufficient to more snugly receive the said end portion of the bill of the hook when the hook is swung upwardly to the full line position shown in Figure 2 of the drawings. In order that the hook may be locked in this position, it is preferable that the fingers 17 be formed near their outer end 18 with transverse openings 19 which are alined with each other and through which any suitable locking device may be passed, such device however not being shown as any of many well known forms of locks may be used for the purpose.

As stated previously the hook normally occupies the full line position shown in Figure 1 or the dotted line position shown in Figure 2, assuming this position by gravity, and in this position the bill of the hook projects beyond the ends of the fingers 17 of the keeper and in a slightly upwardly inclined position so that it is best adapted to have the harness hung upon it. The harness is ordinarily initially placed over the bill of the hook and then suitably looped or otherwise arranged as found desirable, being in the meantime supported by the said bill, and after it has been arranged it is slid rearwardly upon the hook until it rides onto the shank 11 thereof whereupon the hook will be swung about its pivot 9, its shank 11 lowering to the full line position shown in Figure 2 and its bill 12 swinging upwardly to the full line position shown in the said figure and into engagement in the crotch between the fingers 17 of the keeper. The hook will then be in closed position and the harness cannot become accidentally dislodged by animals striking against it as is the case where ordinary hooks are employed, and in fact in order to remove the harness from the hook it is necessary to either slide the harness upwardly and forwardly over the hook or bodily lift the harness until the hook drops to the dotted line position shown in Figure 2 whereupon the harness may be readily disengaged.

It will be observed by reference to Figure 2 that when the hook is in supporting position and the harness is supported thereon, the upper end of the bill of the hook will project above the keeper 15 a greater or less distance so that a harness collar or in fact any other piece of harness may be hung upon the keeper rearwardly of the projecting end of the bill and will be retained against dislodgment by reason of the projection of the said end above the keeper. It will also be observed that the boss 2 serves to space the harness which is hung upon the hook from the surface to which the device is attached so that no difficulty will be experienced in grasping the harness for the purpose of removing it from the hook nor will the harness rub against the said surface if moved about while suspended by the hook.

Having thus described the invention, what is claimed as new is:

1. In a device of the class described, an attaching plate provided with a perpendicular slot terminating with flat top and bottom end walls, arms extending forwardly from the plate, a hook pivotally supported between the ends of said arms, an inwardly extending shank on said hook engaging in said slot and adapted to abut with said top and bottom end walls respectively in open and closed positions of said hook, and a bifurcated keeper integral with said plate adapted to receive the free end of said hook when in closed position.

2. In a device of the class described, an attaching plate provided with a perpendicular slot terminating with flat top and bottom end walls, arms extending forwardly from the plate, a hook pivotally supported between the ends of said arms, an inwardly extending shank on said hook engaging in said slot and adapted to abut with said top and bottom walls respectively in open and closed positions of said hook, a bifurcated keeper integral with said plate adapted to receive the free end of said hook when in closed position, and means connected with said keeper for locking said hook in closed position.

In testimony whereof I affix my signature.

HARVEY W. RAGER. [L. S.]